United States Patent
Patel et al.

(10) Patent No.: US 10,511,631 B2
(45) Date of Patent: Dec. 17, 2019

(54) SAFE DATA ACCESS THROUGH ANY DATA CHANNEL

(71) Applicant: Microsoft Technology Licensing, LLC, Redmond, WA (US)

(72) Inventors: Amar D. Patel, Issaquah, WA (US); Mario D. Goertzel, Bellevue, WA (US); Kristjan E. Hatlelid, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 203 days.

(21) Appl. No.: 15/415,617

(22) Filed: Jan. 25, 2017

(65) Prior Publication Data

US 2018/0213000 A1    Jul. 26, 2018

(51) Int. Cl.
  *G06F 21/00* (2013.01)
  *H04L 29/06* (2006.01)
  *G06F 21/51* (2013.01)
  *G06F 21/53* (2013.01)
  *G06F 21/56* (2013.01)

(52) U.S. Cl.
  CPC .............. *H04L 63/20* (2013.01); *G06F 21/51* (2013.01); *G06F 21/53* (2013.01); *G06F 21/56* (2013.01); *H04L 63/10* (2013.01); *H04L 63/145* (2013.01)

(58) Field of Classification Search
  None
  See application file for complete search history.

(56) References Cited

U.S. PATENT DOCUMENTS

| | | |
|---|---|---|
| 5,956,481 A | 9/1999 | Walsh et al. |
| 7,058,975 B2 | 6/2006 | Edwards et al. |
| 7,096,500 B2 | 8/2006 | Roberts et al. |
| 7,334,722 B1 | 2/2008 | Hartmann |
| 7,340,774 B2 | 3/2008 | Hursey et al. |

(Continued)

FOREIGN PATENT DOCUMENTS

WO    2018004572 A1    1/2018

OTHER PUBLICATIONS

"How do I prevent Mozilla Firefox from Scanning My Downloaded Files Multiple Times?", http://support.eset.com/kb2424/?locale=en_US, Published on: 2008, 1 page.

(Continued)

*Primary Examiner* — Shin-Hon (Eric) Chen
(74) *Attorney, Agent, or Firm* — Workman Nydegger

(57) ABSTRACT

Providing safe access of a data item accessed through one of a plurality of access channels while concurrently providing a policy check of the data item. An indication associated with accessing a data item through one access channel of a plurality of access channels may be received. In response to receiving the indication associated with accessing the data item, the data item may be automatically analyzed to determine whether the data item satisfies a policy. Also in response to receiving the indication associated with accessing the data item and while determining whether the data item satisfies the policy, safe access of the data item may be provided. Regardless of the access channel through which the data item was accessed, any of the policy check, the safe access, and the analysis of the data item may be the same.

20 Claims, 4 Drawing Sheets

(56) References Cited

U.S. PATENT DOCUMENTS

| | | | |
|---|---|---|---|
| 7,581,253 B2 | 8/2009 | Challener et al. | |
| 7,640,586 B1 | 12/2009 | Johnson et al. | |
| 8,307,428 B1* | 11/2012 | Hearnden | H04L 63/145 |
| | | | 713/188 |
| 8,726,388 B2 | 5/2014 | Turbin | |
| 9,843,603 B2* | 12/2017 | Naik | H04L 41/0856 |
| 2005/0063400 A1* | 3/2005 | Lum | H04L 63/20 |
| | | | 370/401 |
| 2005/0091526 A1* | 4/2005 | Alkove | G06F 21/10 |
| | | | 726/26 |
| 2005/0278775 A1* | 12/2005 | Ross | G06Q 20/382 |
| | | | 726/2 |
| 2006/0005254 A1* | 1/2006 | Ross | H04L 63/0263 |
| | | | 726/27 |
| 2008/0052539 A1* | 2/2008 | MacMillan | G06F 21/78 |
| | | | 713/193 |
| 2008/0178290 A1* | 7/2008 | Besch | G06F 21/53 |
| | | | 726/22 |
| 2011/0099609 A1 | 4/2011 | Malhotra et al. | |
| 2011/0296187 A1 | 12/2011 | Bisso et al. | |
| 2012/0166442 A1* | 6/2012 | Furuichi | G06F 17/30707 |
| | | | 707/740 |
| 2012/0192273 A1 | 7/2012 | Turbin et al. | |
| 2013/0254837 A1* | 9/2013 | Brannon | G06F 21/60 |
| | | | 726/1 |
| 2014/0024339 A1* | 1/2014 | Dabbiere | H04M 15/885 |
| | | | 455/406 |
| 2015/0007329 A1 | 1/2015 | Bennett | |
| 2015/0067856 A1 | 3/2015 | Hearnden et al. | |
| 2015/0121534 A1* | 4/2015 | Zhao | G06F 21/6209 |
| | | | 726/26 |
| 2015/0331905 A1* | 11/2015 | Brand | G06F 17/30442 |
| | | | 707/770 |
| 2015/0339143 A1* | 11/2015 | Shih | G06F 9/45558 |
| | | | 718/1 |
| 2016/0006754 A1 | 1/2016 | Woodward et al. | |

OTHER PUBLICATIONS

Poremsky, Diane, "Disable Protected View for Outlook Attachments", http://www.slipstick.com/outlook/disable-protected-view-for-outlook-attachments/, Published on: Sep. 6, 2016, 11 pages.

"How Outlook Helps Protect You from Viruses, Spam, and Phishing", https://support.office.com/en-us/article/How-Outlook-helps-protect-you-from-viruses-spam-and-phishing-97b7a7c0-05fc-4337-9280-a45f41440520, Retrieved on: Dec. 7, 2016, 5 pages.

"International Search Report and Written opinion issued in PCT Application No. PCT/US2017/067458", dated Mar. 16, 2018, 13 Pages.

\* cited by examiner

SAFE DATA ACCESS THROUGH ANY DATA CHANNEL

BACKGROUND

Computer systems and related technology affect many aspects of society. Indeed, the computer system's ability to process information has transformed the way we live and work. Computer systems now commonly perform a host of tasks (e.g., word processing, scheduling, accounting, etc.) that prior to the advent of the computer system were performed manually. More recently, computer systems have been coupled to one another and to other electronic devices to form both wired and wireless computer networks over which the computer systems and other electronic devices can transfer electronic data. Accordingly, the performance of many computing tasks is distributed across a number of different computer systems and/or a number of different computing environments.

These computer systems and environments allow for great ease in sharing, downloading, uploading, transmitting, and/or otherwise accessing various data items such as documents (e.g., .docx file), a link embedded in an email or document, spreadsheets (e.g., .xlsx file), presentations (e.g., .pptx file), uniform resource locators (i.e., URL's), video files (e.g., .mp4 file), audio files (e.g., .mp3 file), image files (e.g., .jpeg file), .exe files, .pdf files, software applications, social media, links to such data items and so forth). Such constant use of transmitted electronic data each day can create a heightened risk of vulnerabilities within these computer systems and environments. For example, the constant sharing of such transmitted data items may allow viruses, or other malicious data, to be transmitted quickly, often times efficiently, and silently in the background without indication to the user. As such, ensuring the safety of electronic data to be shared is critically important in the modern world.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

At least some embodiments described herein relate to provide safe access of a data item accessed through one of a plurality of access channels while concurrently providing a policy check of the data item. For example, embodiments may include receiving an indication associated with accessing a data item through one access channel of a plurality of access channels. In response to receiving the indication associated with accessing the data item, the data item may be automatically analyzed to determine whether the data item satisfies a policy. Additionally, in response to receiving the indication associated with accessing the data item and while determining whether the data item satisfies the policy, safe access of the data item may be provided.

Users and computer systems may be protected when accessing a data item from an external source while still allowing users to safely access at least part of the data item, regardless of the channel through which the data item was accessed. Protection may come from automatically determining whether a data item (that an attempt has been made to access) satisfies one or more policies that have been put in place, while not allowing full access of the data item until the policy determination is complete. Automatically determining whether the data item satisfies policy may also be made more efficient by storing centrally or in a distributed manner (e.g., within a database, persistent store, cryptographic claim within the data item, and so forth) unique identifiers associated with each data item that has been tested, along with a corresponding test result for each tested data item. Each time a new data item is accessed, a unique identifier of the data item may then be compared against the data base to determine whether the data item has already been tested (and if so, determine a result). Doing so may result in more efficient use of time and resources. Additionally, while such determinations/testing are occurring, a user may be given access to a safe version of the data item. As such, users may be given the convenience of safely accessing safe versions of data items while determinations regarding policy satisfaction of data items are being made.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1:
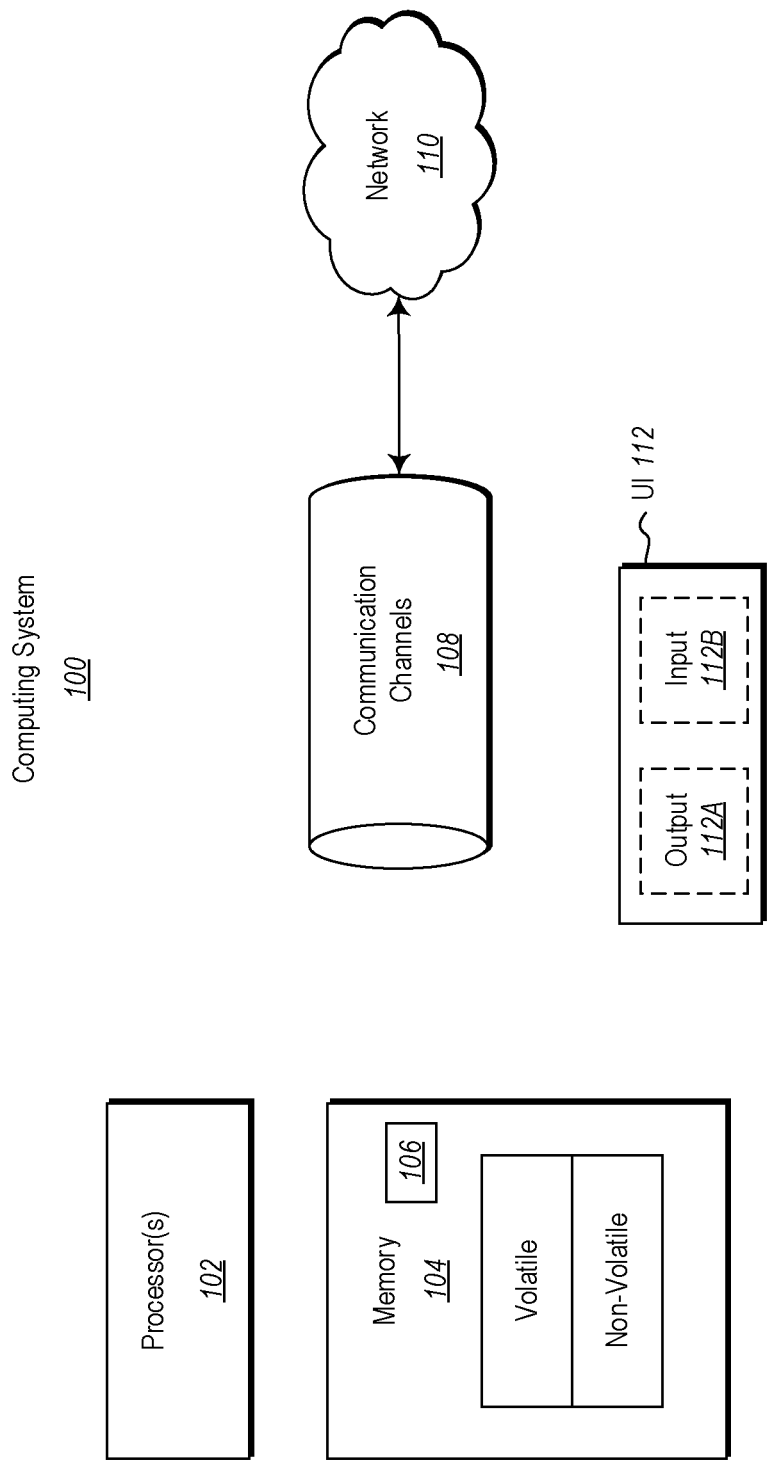
FIG. 1 illustrates an example computer architecture that facilitates operation of the principles described herein.

At least some embodiments described herein relate to provide safe access of a data item accessed through one of a plurality of access channels while concurrently providing a policy check of the data item. For example, embodiments may include receiving an indication associated with accessing a data item through one access channel of a plurality of access channels. In response to receiving the indication associated with accessing the data item, the data item may be automatically analyzed to determine whether the data item satisfies a policy. Additionally, in response to receiving the indication associated with accessing the data item and while determining whether the data item satisfies the policy, safe access of the data item may be provided.

Users and computer systems may be protected when accessing a data item from an external source while still allowing users to safely access at least part of the data item, regardless of the channel through which the data item was accessed. Protection may come from automatically determining whether a data item (that an attempt has been made to access) satisfies one or more policies that have been put in place, while not allowing full access of the data item until the policy determination is complete. Automatically determining whether the data item satisfies policy may also be made more efficient by storing centrally or in a distributed manner (e.g., within a database, persistent store, cryptographic claim within the data item, and so forth) unique identifiers associated with each data item that has been tested, along with a corresponding test result for each tested data item. Each time a new data item is accessed, or originated by any entity (e.g. computer system, computer user, and so forth), a unique identifier of the data item may then be compared against the data base to determine whether the data item has already been tested (and if so, determine a result). Doing so may result in more efficient use of time and resources across the plurality of all accessing entities. Additionally, while such determinations/testing are occurring, a user may be given access to a safe version of the data item. As such, users may be given the convenience of accessing safe versions of data items while determinations regarding policy satisfaction of data items are being made.

Some introductory discussion of a computing system will be described with respect to FIG. 1. Then providing safe access of a data item accessed through one of a plurality of access channels while concurrently providing a policy check of the data item will be described with respect to FIGS. 2 through 5.

Computing systems are now increasingly taking a wide variety of forms. Computing systems may, for example, be handheld devices, appliances, laptop computers, desktop computers, mainframes, distributed computing systems, datacenters, or even devices that have not conventionally been considered a computing system, such as wearables (e.g., glasses). In this description and in the claims, the term "computing system" is defined broadly as including any device or system (or combination thereof) that includes at least one physical and tangible processor, and a physical and tangible memory capable of having thereon computer-executable instructions that may be executed by a processor. The memory may take any form and may depend on the nature and form of the computing system. A computing system may be distributed over a network environment and may include multiple constituent computing systems.

As illustrated in FIG. 1, in its most basic configuration, a computing system 100 typically includes at least one hardware processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well.

The computing system 100 also has thereon multiple structures often referred to as an "executable component". For instance, the memory 104 of the computing system 100 is illustrated as including executable component 106. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component may include software objects, routines, methods, and so forth, that may be executed on the computing system, whether such an executable component exists in the heap of a computing system, or whether the executable component exists on computer-readable storage media.

In such a case, one of ordinary skill in the art will recognize that the structure of the executable component exists on a computer-readable medium such that, when interpreted by one or more processors of a computing system (e.g., by a processor thread), the computing system is caused to perform a function. Such structure may be computer-readable directly by the processors (as is the case if the executable component were binary). Alternatively, the structure may be structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component".

The term "executable component" is also well understood by one of ordinary skill as including structures that are implemented exclusively or near-exclusively in hardware, such as within a field programmable gate array (FPGA), an application specific integrated circuit (ASIC), or any other specialized circuit. Accordingly, the term "executable component" is a term for a structure that is well understood by those of ordinary skill in the art of computing, whether implemented in software, hardware, or a combination. In this description, the terms "component", "service", "engine", "module", "control", or the like may also be used. As used in this description and in the case, these terms (whether expressed with or without a modifying clause) are also intended to be synonymous with the term "executable component", and thus also have a structure that is well understood by those of ordinary skill in the art of computing.

In the description that follows, embodiments are described with reference to acts that are performed by one or more computing systems. If such acts are implemented in software, one or more processors (of the associated computing system that performs the act) direct the operation of the computing system in response to having executed computer-executable instructions that constitute an executable component. For example, such computer-executable instructions may be embodied on one or more computer-readable media that form a computer program product. An example of such an operation involves the manipulation of data.

The computer-executable instructions (and the manipulated data) may be stored in the memory 104 of the computing system 100. Computing system 100 may also contain communication channels 108 that allow the computing system 100 to communicate with other computing systems over, for example, network 110.

While not all computing systems require a user interface, in some embodiments, the computing system 100 includes a user interface 112 for use in interfacing with a user. The user interface 112 may include output mechanisms 112A as well as input mechanisms 112B. The principles described herein are not limited to the precise output mechanisms 112A or input mechanisms 112B as such will depend on the nature of the device. However, output mechanisms 112A might include, for instance, speakers, displays, tactile output, holograms and so forth. Examples of input mechanisms 112B might include, for instance, microphones, touchscreens, holograms, cameras, keyboards, mouse of other pointer input, sensors of any type, and so forth.

Embodiments described herein may comprise or utilize a special purpose or general-purpose computing system including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computing system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: storage media and transmission media.

Computer-readable storage media includes RAM, ROM, EEPROM, CD-ROM or other optical disk storage, magnetic disk storage or other magnetic storage devices, or any other physical and tangible storage medium which can be used to store desired program code means in the form of computer-executable instructions or data structures and which can be accessed by a general purpose or special purpose computing system.

A "network" is defined as one or more data links that enable the transport of electronic data between computing systems and/or modules and/or other electronic devices. When information is transferred or provided over a network or another communications connection (either hardwired, wireless, or a combination of hardwired or wireless) to a computing system, the computing system properly views the connection as a transmission medium. Transmissions media can include a network and/or data links which can be used to carry desired program code means in the form of computer-executable instructions or data structures and which can be accessed by a general purpose or special purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RAM within a network interface module (e.g., a "NIC"), and then eventually transferred to computing system RAM and/or to less volatile storage media at a computing system. Thus, it should be understood that storage media can be included in computing system components that also (or even primarily) utilize transmission media.

Computer-executable instructions comprise, for example, instructions and data which, when executed at a processor, cause a general purpose computing system, special purpose computing system, or special purpose processing device to perform a certain function or group of functions. Alternatively, or in addition, the computer-executable instructions may configure the computing system to perform a certain function or group of functions. The computer executable instructions may be, for example, binaries or even instructions that undergo some translation (such as compilation) before direct execution by the processors, such as intermediate format instructions such as assembly language, or even source code.

Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computing system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, datacenters, wearables (such as glasses) and the like. The invention may also be practiced in distributed system environments where local and remote computing systems, which are linked (either by hardwired data links, wireless data links, or by a combination of hardwired and wireless data links) through a network, both perform tasks. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

Figure 2:
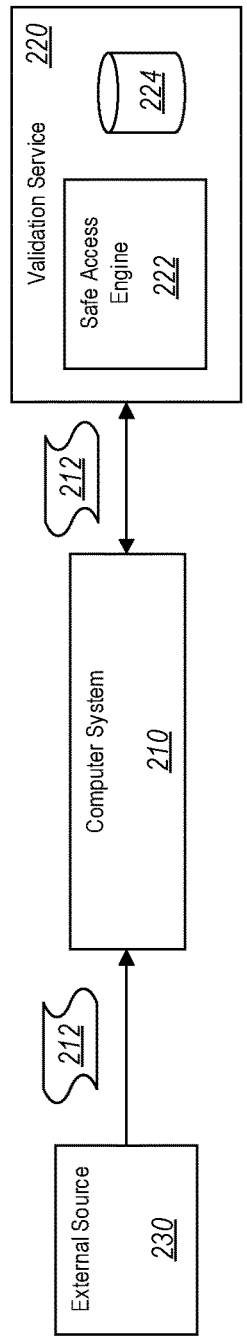
FIG. 2 illustrates an example environment for testing a data item accessed through any of a plurality of channels while concurrently providing a safe view of the accessed data item during the policy check.

FIG. 2 illustrates an example environment 200 for testing a data item accessed through any of a plurality of channels while concurrently providing a safe view of the accessed data item during the policy check, as further described herein. As illustrated, FIG. 2 includes computer system 210 accessing data item 212 from external source 230 and the validation service 220 accessing the data item 212 from the computer system 210. The computer system 210 may correspond to the computer system 100 of FIG. 1. For instance, the computer system 210 may comprise a desktop computer, laptop computer, smart phone, tablet, and so forth. Furthermore, the computer system 210 may utilize any type of operating system (e.g., MICROSOFT® WINDOWS®, APPLE® MACOS™, APPLE IOS®, GOOGLE™ CHROME OS™, GOOGLE ANDROID™, and so forth).

The data item 212 may comprise any applicable data item that can be accessed and/or utilized by the computer system 210. For instance, the data item 212 may include a word processor document (e.g., a .docx file), a link (e.g., a link embedded in an email or document), a spreadsheet file (e.g., a .xlsx file), a presentation file (e.g., a pptx file), a .pdf file, an image file (e.g., a .jpeg file), an audio file (e.g., a .mp3 file), a video file (e.g., a .mp4 file), a .exe file and so forth. Accessing, as used herein, may comprise any actions that may be taken with respect to a data item when using a computer system. For instance, performing any of downloading, storing, saving, editing, modifying, viewing, opening, executing, and so forth with respect to a data item may all be examples of accessing a data item. Additionally, while particular examples of data items and actions associated with accessing data items are discussed herein, the particular examples are discussed only for exemplary purposes and are not meant to limit the invention. Notably, essentially limitless types of data items and ways in which the data items are accessed may be utilized and practiced using the principles described herein.

As briefly described, FIG. 2 also includes the external source 230. The external source 230 may comprise any source of data items or any channel by which data items can be accessed. For instance, external source 230 may include an email attachment, a link (e.g., a Uniform Resource Locator (URL)), a link to a data item, a cloud storage service, a Universal Serial Bus (USB) drive, a Secure Digital (SD) card, an external hard drive, and so forth. In a more specific example, a link to a data item may include a link to a data item that is stored within a cloud storage service. Such a link may be included within a Short Message Service (SMS) text message, a message of an Instant Message Service, a social media service, a body of an email, a webpage, and so forth. Once again, while particular examples of external sources and channels by which data may be accessed are discussed herein, the particular examples are discussed only for exemplary purposes and are not meant to limit the invention. Notably, the principles described herein may be practiced using essentially limitless types of external sources and channels by which data may be accessed by a computer system.

As illustrated, FIG. 2 also includes the validation service 220, which may comprise any service that is capable of determining whether a particular data item (e.g., a file) meets a particular policy or standard. For instance, such policies or standards may relate to malware within a data item, pornography within a data item, audit or archive requirement on a data item, certificates associated with a data item, signatures associated with a data item, and so forth. In a more specific example, an applicable policy may require that no malware be included in a data item, which can then be verified by the validation service 220. As such, the validation service 220 may comprise any type of service that is capable of determining whether a data item satisfies a particular policy or standard.

In a specific example, the validation service 220 may comprise a detonation service that is capable of generating a virtual machine(s) for each data item that is being accessed, or for each data item for which an attempt to access the data item has been made. The generated virtual machine is instrumented to collect data relating to the data item once the data item has been activated. As such, the virtual machine may activate (e.g., execute) a given data item within the environment and collect data relating to the behavior of the data item as it relates to the computing system, applications running on the computing system, or network activity originating from the data item. For instance, the virtual machine may be instrumented to determine how the data item behaves from the perspective of the operating system, how the data item affects an internet connection, how the data item interacts with other data, how the data item affects communication channels, how the data item interacts with other applications, and so forth. Accordingly, such a detonation service may allow a data item to be tested in any number of ways to determine the behavior and properties of the data item.

The validation service 220 may also include a database 224. The database 224 may include both unique identifiers and a corresponding result for each particular data item that has been tested by the validation service 220. For example, the database 224 may use a hash of each particular data item as a unique identifier for each data item that has been tested. Additionally, each particular data item within the database may include a corresponding result indicator that reflects the results of policy or standard checking by the validation service 220. In an example, the result indicator may comprise 'good' or 'bad,' depending on the result of a policy or standard check by the validation service 220. In such an example, 'good' represents that a tested data item satisfies a policy or standard, while 'bad' represents that a tested data item does not satisfy the policy or standard.

Accordingly, each time a data item is accessed from any external source (or through any number of channels) at the computer system 210, the data item may be sent to the validation service 220 for policy testing. In some embodiments, rather than sending the entire data item, a unique identifier associated with the data item (e.g., a hash of the data item) may initially be sent to the validation service. The validation service 220 may then compare the unique identifier of the data item to all of the unique identifiers included within the database 224 to determine whether the data item has previously been tested by the validation service. In circumstances where the validation service 220 receives the data item itself rather than a unique identifier of the data item, the validation service may also be configured to determine a unique identifier associated with the data item that can be used to verify whether the data item has been previously tested.

When the validation service verifies that the data item has previously been tested, the validation service may refrain from testing the data item again. However, when the validation service cannot verify that the data item has been previously tested, the validation service may test the data item, as described more fully herein. The validation service may also return a result associated with testing the data item to the computer system 210. When the data item is found to satisfy an applicable policy, whether by determining that the data item has already been tested (e.g., by comparing a unique identifier of the data item to all unique identifiers in the database 224) or by testing the data item in response to determining that the data item has not been previously tested, the validation service may both inform the computer system 210 of such, and allow the computer system (e.g., a user of the computer system) to access the data item. Alternatively, when the data item is found to not satisfy an applicable policy, the data time may be quarantined and the computer system 210 may be blocked from accessing the data item. The identification of the data item and its associated result of the validation (good or bad) is then stored (associated with the unique identifier) in the database to enable future optimization.

Accordingly, in some embodiments, the computer system 210 may be blocked from accessing the data item before and during testing of the data item by the validation service. In other words, until the validation service has tested the data item or determined that the data item has been tested and complies with any applicable policies, the computer system 210 may be blocked from accessing the data item. In an example, suppose an end user of computer system 210 has received an email that includes a data item as an attachment. When the user attempts to access (e.g., view) the document, a unique identifier of the document (e.g., a hash of the document), or even the document itself, may be sent to the validation service to determine whether the document satisfies any applicable policies, as described more fully herein. While the validation service is determining whether the document satisfies any applicable policies, the end user may be blocked from accessing (e.g., opening) the attached document. Once the validation service has determined a result, the result may be sent to the user and the user may then potentially be allowed to access the attached document (i.e., in circumstances where the document has been found to satisfy an applicable policy).

In some embodiments, the time period a user must wait until a result regarding a data item has been determined may take a relatively long period of time. Accordingly, a user may experience some latency when attempting to access a data item (e.g., attempting to open a document) before actually being able to access the data item. Such latency may be especially relevant with respect to using a detonation service for testing data items, as described further herein. At times detonation services may take a relatively long period of time to sufficiently test a data item.

As such, the detonation service 220 may include safe access engine 222. While the safe access engine 222 is shown as being included within the detonation service 220, the safe access engine may be implemented on the computer system 210, may comprise a standalone service, or may be implemented across multiple computer systems (e.g., across the computer system 210 and the validation service 220). The safe access engine may comprise any combination of hardware and software that is configured to generate a safely accessible data item that is associated with the desired data item. Notably, the safely accessible data item may comprise a translated version of the original data item. For instance, the translated data item may comprise a version of the original data item that has been stripped of executable code, a read-only version of the original data item, a watermarked version of the original data item, a version of the original data item that has been printed to an image file (e.g., a .jpeg), and so forth. In a particular example, the translated safe access version of a data item may comprise a document that has portions of the document that have been redacted.

Accordingly, the safely accessible data item may be accessible by the computer system 210 before the validation service has tested (or finished testing) the original data item, such that even if the original data item does not satisfy an applicable policy, the safely accessible data item may be safely accessed by a user. For example, suppose a user has attempted to access a document that includes text to be read, as well as executable portions that include malware. The validation service first determines whether the document has been tested by comparing a unique identifier of the document against the database 224. If the document has not been tested, the validation service will then test the document against any applicable policies. While the validation service is determining whether the document has been tested (and when tested, determining the result of testing) and/or testing the document, the safe access engine may generate a safely accessible version of the document that has been stripped of all executable portions of the document (i.e., the stripped portions include the malware). The generated safely accessible version of the document may then be made accessible to the user at the computer system 210.

As such, the safely accessible document may be read by an end user of the computer system 210 while the validation service is determining whether the original document satisfies any applicable policies. Accordingly, in this example, while the user is able to view the safely accessible version of the document, the validation service would determine that the original document includes malware, and as such, the original document would be quarantined and blocked from the user. Using the previous example, if the document did not include any malware and satisfied any other applicable policies, the validation service would then allow the user full access to the document (e.g., write privileges) upon determining that the document did indeed satisfy the applicable policy(ies).

Notably, until the computer system 210 has received confirmation that the data item satisfies any applicable policies or standards, the computer system may deny access to the data item. For example, a user attempting to open a document that has not been verified by the validation service 220 to satisfy a policy regarding malware may be restricted from doing so by the computer system 210 until the computer system 210 has received a verification that the document satisfies the malware policy.

Figure 3:
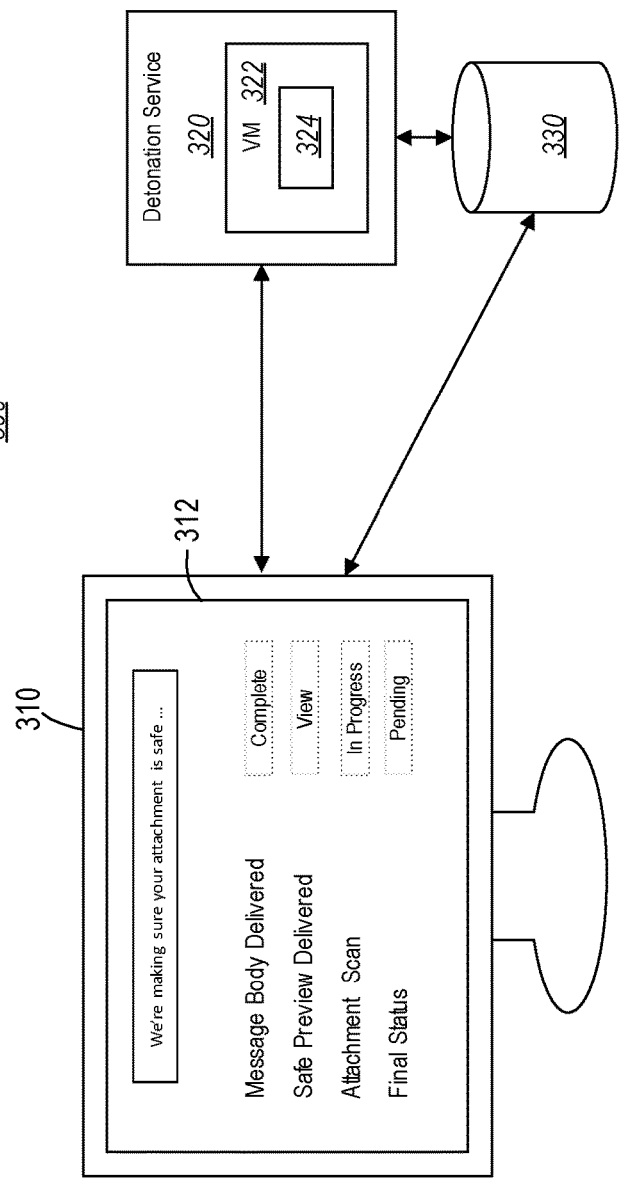
FIG. 3 illustrates a specific example environment that uses a detonation service for providing a policy check on a data item that was attempted to be accessed through email.

FIG. 3 illustrates a specific example environment 300 that uses a detonation service 320 for providing a policy check on a data item that was attempted to be accessed through email, while also providing safe access to the data item during the policy check. As illustrated, FIG. 3 includes a computer system 310 that includes a display 312 that is currently displaying a possible view of an end user of the computer system 310 that is attempting to view an attachment of an email. As illustrated, FIG. 3 also includes a database 330 that includes unique identifiers of all data items that have been previously tested, as well as test results corresponding to each previously tested data item. Notably, while the database 330 of FIG. 3 is shown as being separate from the detonation service 320, the database 330 may be included in the detonation service 320, in some embodiments.

In such an example, when the email is sent that the user of the computer system 310 is viewing, the email may initially travel through an email server. The particular email service used may then automatically instruct the email server to put the email attachment into a queue to be tested by the detonation service 320 before the email attachment may be fully accessed (i.e., accessed without restriction—opened, executed, edited, and so forth). However, before performing the actual testing of the email attachment, the detonation service 320 may compare a unique identifier of the email attachment against the previously tested data items included within the database 330. As described more fully herein, such a comparison may allow the detonation service to determine whether the email attachment has already been tested, and if so, determine the results of the previous testing. When the email attachment has not been previously tested, the detonation service 320 will then generate a virtual machine 322 to be instrumented and utilized to test whether the email attachment 324 satisfies applicable policy.

While the virtual machine is being generated and eventually testing the email attachment, a safe access version of the email attachment may be generated and made accessible to the end user of the computer system 310. For instance, if the email attachment is a word processor document, the safe access version may comprise a read-only version of the email attachment (i.e., the word processor document) that can be viewed, but not edited, by the end user. The safe access version of the email attachment may allow the user to access the document (albeit in limited fashion) even if the testing of the email attachment in the virtual machine environment takes a relatively long period of time. Once the email attachment has been fully tested, the full version of the attachment may be accessed by the user, assuming the attachment satisfies any applicable policies. Additionally, the detonation service may ensure that the database has been populated with the occurrence of the testing of the particular email attachment (i.e., the unique identifier and result of the policy testing of the email attachment will be populated in the database).

As described herein, the detonation service may also have access to the database 330, which includes data items that have been previously tested by the detonation service. Accordingly, the time period associated with the testing process may be greatly reduced, as the email attachment may have been previously tested. In such cases, the detonation service may refrain from testing again and return a result (e.g., 'safe', 'unsafe', and so forth) of the prior testing of the email attachment to the email service being used by the computer system 310. Additionally, the detonation service may inform the computer system and/or email service of whether the email attachment is to be fully accessed by the user or quarantined/blocked.

In the particular email attachment example of FIG. 3, when the detonation service 320 determines that the email attachment 324 has not been previously tested, the email attachment may then automatically be tested by the detonation service for applicable policy. Oftentimes, this may result in policy testing of an email attachment that is completed before the user that receives the email has even had a chance to look at the user's email inbox. While the policy testing may not complete before the email arrives in the user's inbox, the policy testing may complete before the user views or accesses the inbox. Furthermore, in cases where the policy testing is complete when the user first attempts to access the email attachment, the user may simply access the full email attachment (i.e., rather than a safe access version of the attachment or having to wait for policy testing to complete) when the attachment has satisfied applicable policy.

In another example, each data item stored in a cloud storage service may be automatically tested for any applicable policies upon storing the given data item. As described above, while not guaranteed to do so, this may result in policy testing that is completed before the stored data item is accessed, as well as immediate full access of the stored data item when the stored data item satisfies applicable policy. Additionally, as part of automatically testing data items for applicable policy (i.e., through an email service, cloud storage service, and so forth), the database 224 (or database 330) may also be used to determine whether a given data item has already been tested, as described more fully herein. Comparing a unique identifier of a given data item against the database of data items that have already been tested may then further improve the speed with which a user may fully access a data item, as the data item may have already been tested (in which case re-testing may be avoided).

Accordingly, data items that flow through expected channels (e.g., email, cloud storage services, document management services, and so forth) may be compared against a database of previously tested data items and when applicable, tested by the validation service 220 (e.g., the detonation service 320) during transit (e.g., email), upon initial storage (e.g., cloud storage service), and so forth. For example, upon sending an email having an attachment, a hash of the email attachment may automatically be compared against all data items included within the database 330 that have previously been tested for applicable policy to determine whether the email attachment has already been tested (and if so, an immediate result of the testing can be sent to the email service before the user has a chance to view the email). In this way, data items may often be tested for satisfying any applicable policies before a user even attempts to access the data item.

Figure 4:
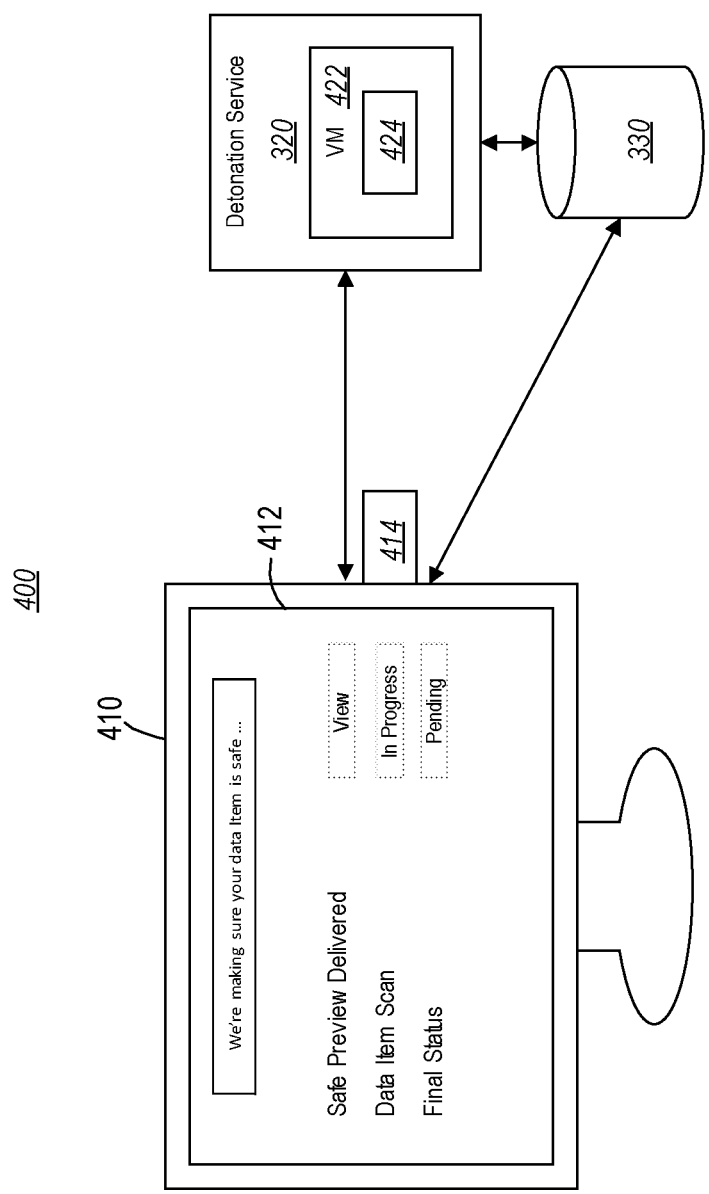
FIG. 4 illustrates a specific example environment that uses a detonation service for providing a policy check on a data item accessed through a USB drive.

FIG. 4 illustrates a specific example environment 400 that uses the detonation service 320 for providing a policy check on a data item accessed through a USB drive, while also providing a safe view of the accessed data item during the policy check. As illustrated, FIG. 4 includes a computer system 410 that includes a display 412 that is currently displaying a possible view of an end user of the computer system 410 that is viewing a user interface associated with opening a data item stored in a USB drive 414. In such an example, assume the user has attempted to access a document stored within the USB drive 414. Upon attempting to access the document, a particular software application or client (e.g., MICROSOFT WORD, ADOBE® READER, GOOGLE DOCS™, and so forth) may be launched.

In some embodiments, such clients may be enlightened such that the client refrains from allowing a user full access to a data item until the client can verify that the data item can be safely accessed. For instance, upon receiving an attempt to open a document using an enlightened client, the client may perform an application programming interface (API) function call to the detonation service 320, regardless of the source/channel from which a data item was accessed. Such an API function call by an enlightened client may include sending a unique identifier of the accessed document (e.g., a hash of the document) to the detonation service to compare the unique identifier against the database 330 to determine whether the document has previously been tested for applicable policy. In other embodiments, the unique identifier of the document may be sent directly to the database 330 to determine whether the document has already been tested for applicable policy.

The enlightened client may then receive a response from the detonation service or database as to whether the document has been tested, as well as a result of the test, when applicable. When the document has already been tested, the enlightened client may make an immediate determination of whether the user can fully access the document based on the result of the prior testing. For example, if the testing resulted in the document satisfying applicable policy, the client may immediately allow full access. However, if the testing resulted in the document not satisfying applicable policy, the document may be quarantined, and the user blocked from full access.

When the document has not been previously tested, the enlightened client may receive a request from the detonation service or database to upload the document to the detonation service for testing of applicable policy. Once the document is received by the detonation service, the detonation service may generate a virtual machine 422 that is configured to test for satisfying applicable policy by the document 424. Concurrently, any combination of the detonation service and the enlightened client may generate a safe access document associated with the document 424 to be utilized by the user while the detonation service is testing the document. Once the detonation service has finished testing the document, the client may receive a result associated with the testing that results in either full access of the document by the user or quarantining/blocking the document from further use.

While the example discussed in relation to FIG. 4 relates to accessing a document stored within a USB drive, any number of other examples may also be used to practice the principles of an enlightened client, as further described herein. For instance, regardless of whether a user accesses a data item from a USB drive, from an SD card, through a link in an email, through a link included in a webpage, and so forth, an enlightened client may be used to access the data item. Such an enlightened document may then refrain from allowing the user to have full access to the data item until the client can determine that the data item satisfies applicable policy, as further described herein. The enlightened client may also allow access to a safe version of the data item while a final determination regarding the data item is taking place.

While enlightened clients have been discussed herein, clients that are not enlightened may also be used to both restrict users from accessing a data item that has not been verified to satisfy applicable policy, while also providing safe access to a translated version of the data item. In such cases an operating system detour may be used to provide the same experience described herein with respect to the enlightened applications. For instance, a shimming API that transparently intercepts API calls of a non-enlightened client may be used to call an applicable driver when the non-enlightened client is being utilized to access a data item through any possible channel (e.g., USB drive, SD card, and so forth). The driver may then send a unique identifier of the data item to the validation service (or the directly to the database) to determine whether the data item has previously been tested.

The validation service may then return a result to the driver associated with whether the data item has already been tested. If the data item has already been tested and the data item satisfies applicable policy, the validation service may inform the driver of such. The driver may then inform the unenlightened client that the user may have full access to the data item. When the data item has already been tested and the data item does not satisfy applicable policy, the data item may be quarantined by the driver/operating system and blocked from further use.

When the data item has not been tested previously, the driver may upload the data item to the validation service for further testing, as described further herein. Simultaneously, the validation service may translate the data item into a safe access version of the data item and send the translated data item to the driver. The driver may then allow the user to access the translated data item via the unenlightened client until testing of the data item is complete. Once testing is complete, the data item may either be fully accessed or quarantined and blocked based on the results of testing. Accordingly, regardless of whether a data item is accessed through an expected channel (e.g., email service, cloud storage service, document management service, and so forth), an unexpected channel (e.g., USB drive, SD card drive, webpage link, and so forth) via an enlightened client, or an unexpected channel via an unenlightened client, automatic detection of previous testing of the data item, testing of the data item, as well as safe access of the data item may concurrently take place. Additionally, regardless of the external source/access channel used to access the data item, any of the applicable policy, the way in which the policy is checked (e.g., via a detonation service), or the way in which safe access of the data item is provided (e.g., read-only data item) may be performed in the same way.

Notably, the principles described herein may also be applied to data items that have been embedded within other data items. For instance, a link (e.g., a URL) embedded within a data item may also be compared against the database 224 to determine if the link has been previously tested for applicable policy. If not, the link (as well as the data item in which the link is embedded) may be tested by the validation service 220 (e.g., the detonation service 320) to determine whether the link satisfies applicable policy. In another example, a unique identifier associated with a file embedded within a data item may be compared against the database 224 to determine whether the embedded file has been previously tested. If not, the embedded file (as well as the data item in which the file is embedded) may be tested by the validation service 220 to determine whether the embedded file satisfies applicable policy. In yet another example, archive format files (e.g., .zip files, .rar files, and so forth) may be tested by the validation service 220 such that both the archive format file and the data items included therein may be tested, as further described herein. In another example, an email embedded within another email may also be tested by the validation service, as further described herein.

While results of tested data items stored within the database 224 (and the database 330) have been described as only having one value (e.g., good or bad), in some embodiments, results corresponding to tested data items may include multiple values. For instance, results corresponding to a previously tested data item may include multiple types of validation based on an intended recipient, an actual recipient, organization policies, and so forth. Notably, these additional results may also be stored within the database 224 (and the database 330).

In a specific example, results associated with testing a particular data item may include both a good or bad determination and a risk, or confidence, score corresponding to the particular data item. The risk/confidence score may indicate the probability that a particular data item satisfies policy. With respect to the risk/confidence score, a recipient user or recipient organization may require that a particular threshold of risk/confidence corresponding to a particular data item be met before a user is given full access to the particular data item.

Additionally, different users may have different policies, even within the same organization. For instance, a regular low-to-mid level employee may have a policy that allows the employee to access a data item that has been verified to have been previously validated for satisfying policy (e.g., through comparing a unique identifier of the data item to a database of previously tested data items). Alternatively, a high-level employee may have a policy that does not allow the employee to access a data item that has been verified to have been previously validated for satisfying policy. In such a case, each time the high-level employee attempts to access a data item, the data item will be newly validated, regardless of whether the data item has been validated in the past. Accordingly, the validation service 220 may be configured to determine various types of validation (i.e., other than good/bad), including a confidence or risk score associated with a particular data item, as well as different policies based on the user attempting to access the data item.

Alternatively, or additionally, results of any type may also expire based on a policy of a user, an organization, the validation service 220, the database 224, and so forth. As such, once a result corresponding to a particular data item has expired, any subsequent access of the particular data item may trigger a new analysis of the data item by the validation service 220. Data items accessed within highly restricted environments (e.g., a military or government organization) may be re-tested or re-validated frequently to ensure that no tampering of data items has occurred. Frequent re-validation of accessed data items in highly restricted environments (or any environment) may also occur to allow for advancements in validation services (e.g., the detonation service 320) or changes in applicable policy. For instance, the validation service 220 may continually be upgraded and improved with respect to determining whether data items satisfy applicable policy.

As such, frequent re-validation may be particularly useful in circumstances that include a data item comprising a "time bomb" that is configured to execute only in a particular context (e.g., at or after a particular time/date, in response to being accessed by a particular user, and so forth). Improvements in the validation service and frequent re-validation may then work together to allow for detecting such data items (e.g., once the particular date/time associated with the time bomb has already occurred, the validation service will be able to fully access/test the time bomb data item and improvements in the validation service may allow for detecting such). In another example, a document that sits idle in a cloud storage service for a long period of time may also be re-tested or re-validated periodically to ensure that either no tampering of the document has occurred or applicable policy has been satisfied (e.g., policy that requires periodic validation of data items). In some embodiments, data items may be re-validated each time applicable policy changes.

Notably, while comparing a unique identifier to the database 224 to quickly determine whether a data item satisfies applicable policy is discussed throughout, other ways of quickly determining whether a data item satisfies applicable policy may also be used. For instance, a cryptographically secure claim associated with an accessed data item may be used by a service/client through which the data item is being accessed (e.g., email service, word processor client, and so forth). The service/client may sign the claim, which claim indicates that the accessed data item has previously been tested and found to satisfy applicable policy. The claim may then be included within the data item such that a service/client may be able to determine that the data item satisfies policy even when the service/client is offline (e.g., unable to communicate with the database 224).

Additionally, in some embodiments, users may be given control over which data items are to be tested before full access of the data item is given to the user. For instance, a user may be able to determine that the user will be able to fully access data items based on the channel through which the data item was accessed (e.g., email service, cloud storage service, and so forth), based on the type of data item, and so forth. In a particular example, a user may elect to be able to immediately open any email attachment that is received from a particular user. Even when the user has elected to view some data items immediately, testing (e.g., via a detonation service) may be performed in the background such that the user may eventually be informed of the testing results. Such control over which data items can be fully accessed immediately (i.e., without first being tested for applicable policy) may be given to a user via a user interface of the service or client to be used to access documents, via a user interface of an operating system of the computer system 210, and so forth.

Figure 5:
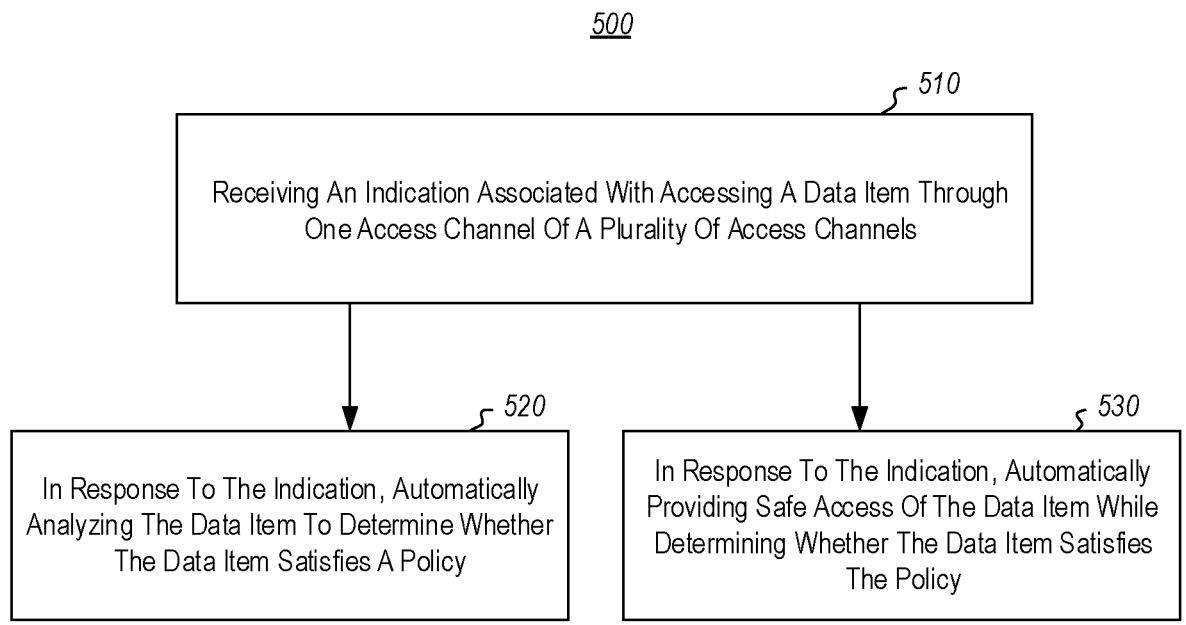
FIG. 5 illustrates a flowchart of a method for providing safe access of a data item accessed through one of a plurality of access channels while concurrently providing a policy check of the data item

FIG. 5 illustrates a flowchart of a method 500 for providing safe access of a data item accessed through one of a plurality of access channels while concurrently providing a policy check of the data item. The method 500 will be described with frequent reference to FIG. 2. The method 500 may include receiving an indication associated with accessing a data item through one access channel of a plurality of access channels (Act 510). For instance, the computer system 210 may receive an indication that a user has attempted to access an email attachment, a document stored within a USB drive, a link within a text message, and so forth.

In response to receiving the indication associated with accessing the data item, a number of actions may then be automatically performed, regardless of the access channel through which the data item was accessed. For instance, the method 500 may further include analyzing the data item to determine whether the data item satisfies a policy in response to receiving the indication (Act 520). For example, a unique identifier of the data item that was accessed (or of which an attempt was made to access) may be sent to the validation service (and ultimately the database 224) to determine whether the data item has been previously tested for applicable policy. If so, the result of the previous testing may be sent to the computer system 210, which may result in either full access to the data item or blocking/quarantining the data item from further access.

When the data item has not been previously tested, the data item may then be tested (e.g., via detonation service 320) for satisfaction of applicable policy. The method 500 may also include, in response to the indication and while determining whether the data item satisfies the policy, providing safe access of the data item (Act 530). For instance, while the data item is being tested for applicable policy, a safe access version of the data item may be generated and made accessible to the user. Once testing is complete, the user may be given full access to the data item when the data item satisfies applicable policy. Alternatively, when the data item is found not to satisfy applicable policy, the data item may blocked/quarantined from further use by the user.

In this way, users and computer systems may be protected when accessing a data item from an external source while still allowing users to safely access at least part of the data item, regardless of the channel through which the data item was accessed. Protection may come from automatically determining whether a data item (that an attempt has been made to access) satisfies one or more policies that have been put in place, while not allowing full access of the data item until the policy determination is complete. Automatically determining whether the data item satisfies policy may also be made more efficient by storing (within a database) unique identifiers associated with each data item that has been tested, along with a corresponding test result for each tested data item. Each time a new data item is accessed, a unique identifier of the data item may then be compared against the data base to determine whether the data item has already been tested (and if so, determine a result). Doing so may result in more efficient use of time and resources. Additionally, while such determinations/testing are occurring, a user may be given access to a safe version of the document. As such, users may be given the convenience of safely accessing safe versions of data items while determinations regarding policy satisfaction of data items are being made.

Although the subject matter has been described in language specific to structural features and/or methodological acts, it is to be understood that the subject matter defined in the appended claims is not necessarily limited to the described features or acts described above, or the order of the acts described above. Rather, the described features and acts are disclosed as example forms of implementing the claims.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. A computer system comprising:
   one or more processors; and
   one or more computer-readable hardware storage media having stored thereon computer-executable instructions that are executable by the one or more processors to cause the computer system to provide safe access of a data item accessed through one of a plurality of access channels while concurrently providing a policy check of the data item, the computer-executable instructions including instructions that are executable to cause the computer system to perform at least the following:

receive an indication associated with accessing a data item through one access channel of a plurality of access channels; and in response to receiving the indication associated with accessing the data item, automatically perform at least the following regardless of the access channel through which the data item was accessed:

analyzing the data item to determine whether the data item satisfies a policy, wherein determining whether the data item satisfies the policy comprises generating a virtual machine to activate the data item; and while determining whether the data item satisfies the policy:

translating the data item into a different safe access version of the data item, including portions that have not previously been determined to satisfy the policy; and providing the safe access version of the data item.

2. The computer system in accordance with claim 1, wherein the one access channel of the plurality of access channels comprises a Universal Serial Bus (USB) drive.

3. The computer system in accordance with claim 1, wherein the one access channel of the plurality of access channels comprises one of a USB drive, an email service, or a link to a cloud storage service.

4. The computer system in accordance with claim 1, wherein providing the safe access version of the data item comprises displaying a read-only copy of the data item.

5. The computer system in accordance with claim 1, wherein the computer-executable instructions further include instructions that are executable to cause the computer system to identify whether the data item has previously been determined to satisfy the policy.

6. The computer system in accordance with claim 5, wherein the computer-executable instructions further include instructions that are executable to cause the computer system to refrain from analyzing the data item when the data item has been identified to have previously been determined to satisfy the policy.

7. The computer system in accordance with claim 1, wherein analyzing the data item comprises analyzing the data item within a virtual machine generated only to analyze whether the data item satisfies the policy.

8. The computer system in accordance with claim 1, wherein the policy is satisfied when the data item is free of malware.

9. The computer system in accordance with claim 1, wherein the data item comprises a uniform resource locator.

10. The computer system in accordance with claim 1, wherein, regardless of the access channel used to access the data item, at least one of the policy, the policy check, or the safe access is the same.

11. A method, implemented at a computer system that includes one or more processors, for providing safe access of a data item accessed through one of a plurality of access channels while concurrently providing a policy check of the data item, comprising:

receiving an indication associated with accessing a data item through one access channel of a plurality of access channels; and in response to receiving the indication associated with accessing the data item, automatically performing at least the following regardless of the access channel through which the data item was accessed:

analyzing the data item to determine whether the data item satisfies a policy, wherein determining whether the data item satisfies the policy comprises generating a virtual machine to activate the data item; and while determining whether the data item satisfies the policy:

translating the data item into a different safe access version of the data item, including portions that have not previously been determined to satisfy the policy; and providing the safe access version of the data item.

12. The method in accordance with claim 11, wherein the one access channel of the plurality of access channels comprises a Universal Serial Bus (USB) drive.

13. The method in accordance with claim 11, wherein the one access channel of the plurality of access channels comprises one of a USB drive, an email service, or a link to a cloud storage service.

14. The method in accordance with claim 11, wherein providing safe access to the data item comprises displaying a read-only copy of the data item.

15. The method in accordance with claim 11, further comprising identifying whether the data item has previously been determined to satisfy the policy.

16. The method in accordance with claim 15, further comprising refraining from analyzing the data item when the data item has been identified to have previously been determined to satisfy the policy.

17. The method in accordance with claim 11, wherein analyzing the data item comprises analyzing the data item within a virtual machine generated only to analyze whether the data item satisfies the policy.

18. The method in accordance with claim 11, wherein the policy is satisfied when the data item is free of malware.

19. The method in accordance with claim 11, wherein, regardless of the access channel used to access the data item, at least one of the policy, the policy check, or the safe access is the same.

20. A computer program product comprising one or more hardware storage devices having stored thereon computer-executable instructions that are executable by one or more processors of a computer system to provide safe access of a data item accessed through one of a plurality of access channels while concurrently providing a policy check of the data item, the computer-executable instructions including instructions that are executable to cause the computer system to perform at least the following:

receive an indication associated with accessing a data item through one access channel of a plurality of access channels; and in response to receiving the indication associated with accessing the data item, automatically perform at least the following regardless of the access channel through which the data item was accessed:

analyzing the data item to determine whether the data item satisfies a policy, wherein determining whether the data item satisfies the policy comprises generating a virtual machine to activate the data item; and while determining whether the data item satisfies the policy:

translating the data item into a different safe access version of the data item, including portions that have not previously been determined to satisfy the policy; and providing the safe access version of the data item.

* * * * *